(No Model.)

F. H. SMITH.
ELECTRODE FOR SECONDARY BATTERIES.

No. 410,037. Patented Aug. 27, 1889.

WITNESSES:
John E. Morris
A. O. Balendrier

INVENTOR
F. H. Smith
BY
Chas. B. Mann
ATTORNEY.

UNITED STATES PATENT OFFICE.

FREDERICK H. SMITH, OF BALTIMORE, MARYLAND.

ELECTRODE FOR SECONDARY BATTERIES.

SPECIFICATION forming part of Letters Patent No. 410,037, dated August 27, 1889.

Application filed April 3, 1889. Serial No. 305,864. (No model.)

*To all whom it may concern:*

Be it known that I, FREDERICK H. SMITH, a citizen of the United States, residing at Baltimore, in the State of Maryland, have invented certain new and useful Improvements in Storage or Secondary Electrical Batteries, of which the following is a specification.

My invention has reference to the construction of plates or electrodes for secondary or storage electrical batteries.

Figure 1:
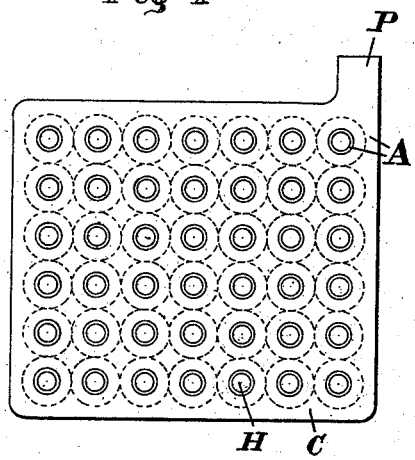
Figure 2:
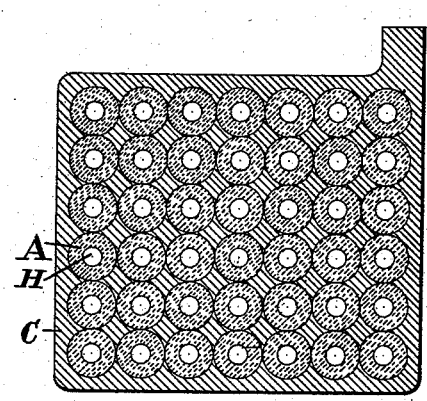
Figure 3:
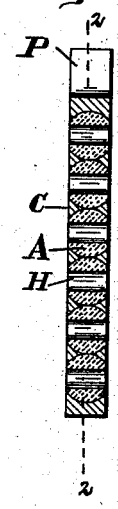
Figure 4:
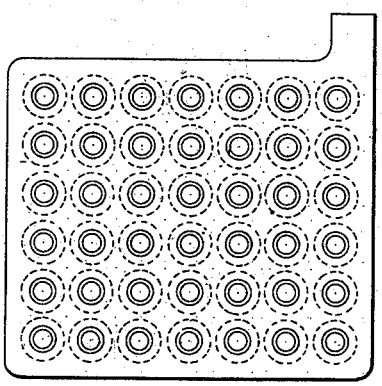
Figure 5:
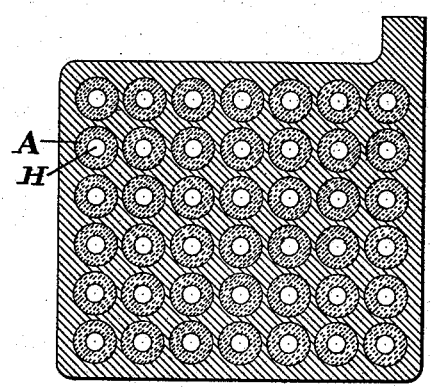
Figure 6:

In the accompanying drawings, Figure 1 is a side view of an electrode constructed according to my invention. Fig. 2 is a vertical longitudinal section of the same on the line 2 2 of Fig. 3. Fig. 3 is a vertical cross-section of the electrode shown in Figs. 1 and 2. Figs. 4, 5, and 6 are similar views to those shown in Figs. 1, 2, and 3, and differ therefrom only in that the pieces of active material are separated from each other.

The letter A designates the pieces of active material; C, the conducting material, which forms a matrix or frame to hold or bind the said pieces of active material. The conducting material has a connecting-post P. The active material is preferably composed of oxide of lead or lead sponge in a finely-divided form, either in powder, grains, or flakes, and made up into balls or other pieces A, of any desired size or shape, by any suitable shaping device or agglomerating process, with or without pressure or agglutinating substances, and each ball or shape having a hole H all the way through it to expose a greater surface to the direct action of the electrolyte, and to facilitate the circulation of the latter through the plate. The conducting material is preferably composed of metallic lead, but can be of other substances capable of being cast. The pieces A of active material may be in contact with each other in the interior of the electrode, as shown in Figs. 2 and 3, or each piece may be separated from the other, as shown in Figs. 5 and 6.

In forming the electrodes or plates the prepared pieces A of active material, which form hollow plugs or tubes of round, square, hexagonal, or other shapes, are placed in a suitable mold, and then the conducting material C while in suitable condition is cast into the mold and fills the mold and the interstices or spaces between the said pieces of active material, but without filling the holes H. In this way the tubular pieces of active material A are bound together in a matrix or frame of conducting material C, and the whole forms a durable plate. It will be seen that the conducting material of metallic lead C will securely hold the pieces of active material A from displacement.

Having described my invention, I claim—

A plate or electrode for secondary batteries, consisting of tubular pieces of lead oxide or other active material, or lead sponge or other material conditioned to become active, held in a matrix of lead or other conducting material which is cast around and between said pieces, as set forth.

In testimony whereof I affix my signature in the presence of two witnesses.

FREDERICK H. SMITH.

Witnesses:
JOHN E. MORRIS,
JNO. T. MADDOX.